No. 772,129.

Patented October 11, 1904.

UNITED STATES PATENT OFFICE.

WILLIAM M. BURTON, OF CHICAGO, ILLINOIS, ASSIGNOR TO STANDARD OIL COMPANY, OF CHICAGO, ILLINOIS, A CORPORATION OF INDIANA.

PROCESS OF MAKING HYDROXY STEARIC ACID.

SPECIFICATION forming part of Letters Patent No. 772,129, dated October 11, 1904.

Application filed August 12, 1904. Serial No. 220,533. (No specimens.)

*To all whom it may concern:*

Be it known that I, WILLIAM M. BURTON, a citizen of the United States, residing at Chicago, in the county of Cook and State of Illinois, have invented a new and useful Process of Manufacturing Hydroxy Stearic Acid from Oleic Acid, of which the following is a specification.

My invention relates to an improved procedure in the manufacture of hydroxy stearic acid, $\left(C_{17}H_{34}\diagup_{OH}^{COOH}\right)$ from oleic acid ($C_{17}H_{33}$COOH,) with the object of enhancing the economy in producing the first-named substance by greatly increasing the yield thereof over that resulting from any known process hitherto practiced for the same purpose, without materially, if at all, increasing the expense involved in treating the oleic acid to be converted.

To practice my improved process in the best manner now known to me, I proceed as follows: I first dilute the oleic acid to be treated with a suitable diluent, preferably a liquid hydrocarbon of the so-called "paraffin" series, which is not acted upon by sulfuric acid, ($H_2SO_4$.) Any distilled petroleum may be used; but for the best results that of 60° gravity Baumé should be employed in the proportion of about two parts, by volume, to one part, by volume, of oleic acid. Other diluents, including any of the ethers or of the alcohols, may be used instead of petroleum, which, however, is preferred, though my invention is not intended to be limited thereto, for it consists, broadly, in the initial step of diluting the oleic acid, with the result and advantage of subdividing it, and thereby exposing its particles extensively to the action of the reagent employed for converting the oleic acid into saturated oleic acid, which constitutes the second step in my improved process. For this last-named purpose any reagent may be employed which exerts what is known in chemistry as a "polymerizing" action, such as zinc chlorid, ($ZnCl_2$;) but I prefer to employ sulfuric acid in the proportion of about one part, by weight, to three parts, by weight, of the oleic acid, which latter takes up the sulfuric acid and forms sulfo-oleic acid. Thus

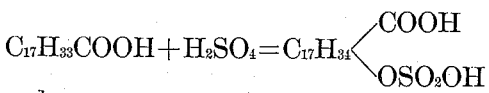

and

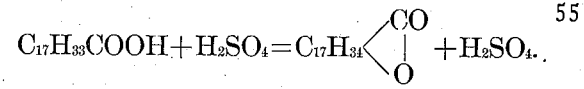

The foregoing steps should be practiced under a low temperature, not to exceed, say, 40° Fahrenheit. The resultant product is then subjected to the third step of the process, consisting in heating it with steam introduced therein, with the effect of producing hydroxy stearic acid, thus primarily accomplishing my purpose, with the following reaction:

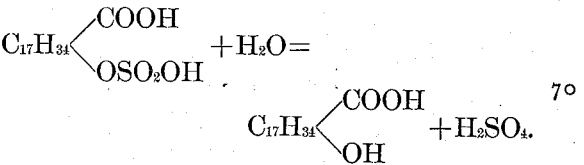

By thus diluting the oleic acid to enhance the exposure of its particles to the action of the reagent the yield of hydroxy stearic acid is very greatly increased, the increase amounting to fully one hundred per cent. over the yield thereof under former processes, the best of which produces a yield of the hydroxy stearic acid not to exceed twenty-five per cent. of the amount theoretically obtainable from the oleic acid treated, while by my improvement fully one-half of such oleic acid is converted into hydroxy stearic acid. The solution containing the yield of hydroxy stearic acid, with the petroleum and substances not acted on by sulfuric acid, is then separated from the sulfuric acid by allowing the steam-heated product to stand for an hour or longer, whereby the weak sulfuric acid falls by its greater specific gravity to the bottom of the vessel in which the treatment is carried on and is drawn off and may be concentrated in any known or suitable manner to recover it for use over again in the manner already described. Thereupon hot petroleum naphtha in proportion about equal to the quantity of residual oils is added to the latter and dissolves the pure hydroxy stearic acid and the other substances contained with it in the mixture, or instead of the naphtha any of the alcohols or ethers or chloroform or any other suitable solvent may be used for this purpose. The solution is then cooled to about 40° Fahrenheit, whereby the pure hydroxy stearic acid separates in white crystalline form, leaving behind the other substances in solution in the solvent. The mixture is thereupon filtered to recover the crystals, which are then dried by subjecting them to the action of a centrifugal drying-machine or otherwise, when they are ready for use. The naphtha or other solvent employed containing the other materials may be distilled off, leaving them as a residue and recovering the naphtha to be used over again. By the procedure thus described about fifty per cent. of the oleic acid treated is converted into hydroxy stearic acid, as aforesaid, and this without material loss of the reagent and solvents employed. The remainder of the oleic acid, constituting about fifty per cent. thereof, has been converted by the action of the reagent partially into stearo-lactone 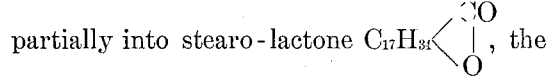, the remainder being oleic acid unacted upon, and these may be reconverted by distillation, the oleic acid coming over through the tail-pipe of the still and being susceptible of treatment in the manner described to convert it into hydroxy stearic acid.

By thus subjecting the original charge of oleic acid to the treatment as described, reconverting the residual presumed stearo-lactones into oleic acid, and subjecting the latter again to the same treatment I recover from, say, one hundred gallons of raw oleic acid a yield of about eighty-five to ninety per cent. of hydroxy stearic acid as compared with twenty-five to thirty per cent., which is the highest yield obtainable by other methods of treatment known to me.

What I claim as new, and desire to secure by Letters Patent, is—

1. The process of manufacturing hydroxy stearic acid from oleic acid, which consists in diluting the oleic acid with a suitable diluent, converting the mixture to a saturated oleic acid by adding thereto a suitable polymerizing agent, and introducing steam into the resultant solution, thereby converting the oleic acid into hydroxy stearic acid.

2. The process of manufacturing hydroxy stearic acid from oleic acid, which consists in diluting the oleic acid with a liquid hydrocarbon, converting the mixture to a saturated oleic acid by adding thereto a suitable polymerizing agent, and introducing steam into the resultant solution, thereby converting the oleic acid into hydroxy stearic acid.

3. The process of manufacturing hydroxy stearic acid from oleic acid, which consists in diluting the oleic acid with a liquid hydrocarbon of the paraffin series, converting the mixture to a saturated oleic acid by adding thereto sulfuric acid, thereby forming sulfo-oleic acid, and introducing steam into the resultant solution, thereby producing hydroxy stearic acid.

4. The process of manufacturing hydroxy stearic acid from oleic acid, which consists in diluting the oleic acid with a suitable diluent, converting the mixture to a saturated oleic acid by adding thereto a suitable polymerizing agent, introducing steam into the resultant solution, thereby converting the oleic acid into hydroxy stearic acid, separating and withdrawing said agent, dissolving the hydroxy stearic acid by adding to the residual oils a suitable solvent, thereupon cooling the solution to reduce the pure hydroxy stearic acid to crystalline form, and finally removing and drying the crystals.

5. The process of manufacturing hydroxy stearic acid from oleic acid, which consists in diluting the oleic acid with a liquid hydrocarbon, converting the mixture to a saturated oleic acid by adding thereto a suitable polymerizing agent, introducing steam into the resultant solution, thereby converting the oleic acid into hydroxy stearic acid, separating and withdrawing said agent, dissolving the hydroxy stearic acid by adding to the residual oils a suitable solvent, thereupon cooling the solution to reduce the pure hydroxy stearic acid to crystalline form, and finally removing and drying the crystals.

6. The process of manufacturing hydroxy stearic acid from oleic acid, which consists in diluting the oleic acid with a liquid hydrocarbon of the paraffin series, converting the mixture to a saturated oleic acid by adding thereto sulfuric acid, thereby forming sulfo-oleic acid, introducing steam into the resultant solution, thereby producing hydroxy stearic acid, separating and withdrawing the sulfuric acid, dissolving the hydroxy stearic acid by adding to the residual oils a suitable solvent, thereupon cooling the solution to reduce the pure hydroxy stearic acid to crystalline form, filtering the solution to separate the crystals, and drying the crystals.

7. The process of manufacturing hydroxy stearic acid from oleic acid, which consists in diluting the oleic acid with a liquid hydrocarbon of the paraffin series, converting the mixture to a saturated oleic acid by adding thereto sulfuric acid, thereby forming sulfo-oleic acid, introducing steam into the resultant solution, thereby producing hydroxy stearic acid, separating and withdrawing the sulfuric acid, dissolving the hydroxy stearic acid by adding to the residual oils hot petroleum naphtha, then cooling the solution to reduce the pure hydroxy stearic acid to crystalline form, filtering the solution to recover the crystals and drying the recovered crystals.

WILLIAM M. BURTON.

In presence of—
  WALTER N. WINBERG,
  L. HEISLAR.